US006430546B1

(12) United States Patent
Stewart et al.

(10) Patent No.: US 6,430,546 B1
(45) Date of Patent: Aug. 6, 2002

(54) DATA ANALYSIS METHOD FOR CLARIFICATION OF PERCEPTIONS

(75) Inventors: Valerie Glenys Stewart, Somerton; Christopher John Mayes, Mount Victoria, both of (NZ)

(73) Assignee: Enquire Within Developments Limited, Wellington (NZ)

( * ) Notice: Subject to any disclaimer, the term of this patent is extended or adjusted under 35 U.S.C. 154(b) by 0 days.

(21) Appl. No.: 09/284,963

(22) PCT Filed: Nov. 7, 1997

(86) PCT No.: PCT/NZ97/00154

§ 371 (c)(1), (2), (4) Date: Jul. 7, 1999

(87) PCT Pub. No.: WO98/20431

PCT Pub. Date: May 14, 1998

(30) Foreign Application Priority Data

Nov. 7, 1996 (NZ) ............................................. 299709

(51) Int. Cl.[7] ............................................. G06F 17/00
(52) U.S. Cl. ........................... 706/50; 706/60; 707/102
(58) Field of Search ............................. 706/45, 60, 61, 706/50, 48; 707/102, 2

(56) References Cited

U.S. PATENT DOCUMENTS 4,905,163 A * 2/1990 Garber et al. ................. 706/55
5,245,698 A * 9/1993 Matsunaga ................... 706/60

(List continued on next page.)

OTHER PUBLICATIONS

Tamori, Y.; "Theory and Simulations of Dendritic Morphology". Proceedings of 1993 International Joint Conference on Neural Networks, Oct. 1993, vol. 1, pp. 127–130.*

Day, P.; "An interactive data analysis system developed under APL". Proceedings of the international conference on APL 1991, Aug. 1991, pp. 106–117.*

Sage, A. P.; "Dialog generation and management system for conflict analysis". IEEE international conference on Systems, Man, and cybernetics, 1991, Oct. 1991, vol. 3, pp. 1978–1983.*

Thought Processing, written and published at http://psyctc1.sghms.ac.uk/grids/ingrid96/examples.htm, authored by Jim Legg, first published in Jun. 1987, last update on Oct. 23, 1996 (10 pages).

James Legg's Repertory Grid and Thought Processing Directory, written and published at http://psyctc1.sghms.ac.uk/grids/ingrid96/default.htm, authored by James Legg, last updated on Oct. 23, 1996 (16 pages).

Omnigrid, written and published at http://psyctc.sgnms.ac.uk/grids/omnigrid.htm, authored by Chris Evans, downloaded in Mar., 1996 and last updated in Oct. 1996 (3 pages).

Webgrid: A WWW PCP Server, written and published at http://tiger.cpsc.ucalgary.ca/WebGrid/, published since Apr., 1995 (3 pages).

*Primary Examiner*—Thomas Black
*Assistant Examiner*—Kelvin Booker
(74) *Attorney, Agent, or Firm*—Dickinson Wright PLLC

(57) ABSTRACT

A method of and apparatus for analyzing thoughts, perceptions, knowledge, feelings etc., of an individual. A set of elements are input or selected by a user. A single element and a pair of elements are formed. A user inputs similar characteristics between the pair of elements and different characteristics between the single element and pair of elements. This is performed for a number of iterations and elements and characteristic combinations. The elements are then ranked by a user in relation to each characteristic and the rankings are analyzed to determine the correlation between elements and characteristics. The analysis may be expanded or refined and further elements and characteristics may be added at any stage.

54 Claims, 10 Drawing Sheets

U.S. PATENT DOCUMENTS

| | | | | | |
|---|---|---|---|---|---|
| 5,259,067 | A | * | 11/1993 | Kautz et al. | 706/57 |
| 5,396,622 | A | * | 3/1995 | Lee et al. | 706/2 |
| 5,495,558 | A | * | 2/1996 | Tashima | 706/52 |
| 5,497,449 | A | * | 3/1996 | Miyazawa | 706/52 |
| 5,524,176 | A | * | 6/1996 | Narita et al. | 706/2 |
| 5,625,767 | A | * | 4/1997 | Bartell et al. | 706/2 |
| 5,720,005 | A | * | 2/1998 | Goke et al. | 706/1 |
| 5,764,824 | A | * | 6/1998 | Kurtzberg et al. | 706/50 |
| 5,796,919 | A | * | 8/1998 | Kubica | 706/1 |
| 5,832,182 | A | * | 11/1998 | Zhang et al. | 706/2 |
| 5,832,496 | A | * | 11/1998 | Anand et al. | 706/54 |
| 5,870,746 | A | * | 2/1999 | Knutson et al. | 707/101 |
| 6,092,060 | A | * | 7/2000 | Guinta et al. | 706/47 |
| 6,161,101 | A | * | 12/2000 | Guinta et al. | 706/45 |

* cited by examiner

DATA ANALYSIS METHOD FOR CLARIFICATION OF PERCEPTIONS

THE TECHNICAL FIELD

This invention relates to a method of analysis and an apparatus for implementing the method. More particularly, but not exclusively, the present invention relates to an analysis tool for exploring the thoughts, perceptions, knowledge and feelings of an individual.

The present invention provides an open and flexible tool having wide ranging potential applications. The present invention may find application in education, commerce, self analysis, entertainment, market research, expert systems, interviewing, designing organisational competencies, bench marking cultures, developing personnel specifications etc.

BACKGROUND OF THE INVENTION

To date a variety of techniques have been used which attempt to use the underlying principles for counselling and to research areas in which counselling is required. Computer implemented systems have been produced where the results of a consultation session may be input into a computer and processed to highlight strong correlations between data (be it people, concepts, emotions, ideas etc). This approach is limited in that an experienced interviewer is required to interview the subject in order to obtain the data to be processed. Further, there is typically a single iteration of the programme run to highlight the areas in which counselling is required. The results are therefore not as refined as they would be if a number of iterations could be performed.

DISCLOSURE OF THE INVENTION

It is an object of the present invention to provide an interactive analysis method and apparatus which enables a user to explore their thoughts, perceptions and feelings etc in a desired area without requiring input from a professional interviewer, or to at least provide the public with a useful choice.

According to a first aspect of the invention there is provided an apparatus for analysing data comprising:

- means for inputting or selecting a plurality of data elements according to user command;
- means for grouping data elements into groups;
- means for communicating the elements of the groups to a user;
- means for inputting or selecting characteristics within and/or between data element groups according to user command;
- means responsive to user command for ranking data elements in relation to selected characteristics; and
- means for comparing rankings between elements and/or characteristics and for determining the elements and/or characteristics having selected degrees of correlation including means for selecting a user defined correlation threshold and displaying those elements or characteristics above or below the correlation threshold.

According to a further aspect of the invention there is provided a computer controlled method of analysing data comprising:

- inputting a plurality of data elements into a data processor or selecting a plurality of elements stored in memory of the data processor;
- actuating the data processor to group the data elements into groups;

- inputting or selecting characteristics within or between the elements;
- inputting ranking information to the data processor to rank the data elements in relation to the characteristics;
- processing rankings between elements and/or characteristics in the data processor to determine elements and/or characteristics having selected levels of correlation;
- inputting a correlation threshold; and
- displaying those elements or characteristics having a degree of correlation above or below the correlation threshold.

BRIEF DESCRIPTION OF THE DRAWINGS

The invention will now be described by way of example with reference to the accompanying drawings in which.

BEST MODE FOR CARRYING OUT THE INVENTION

Figure 1:
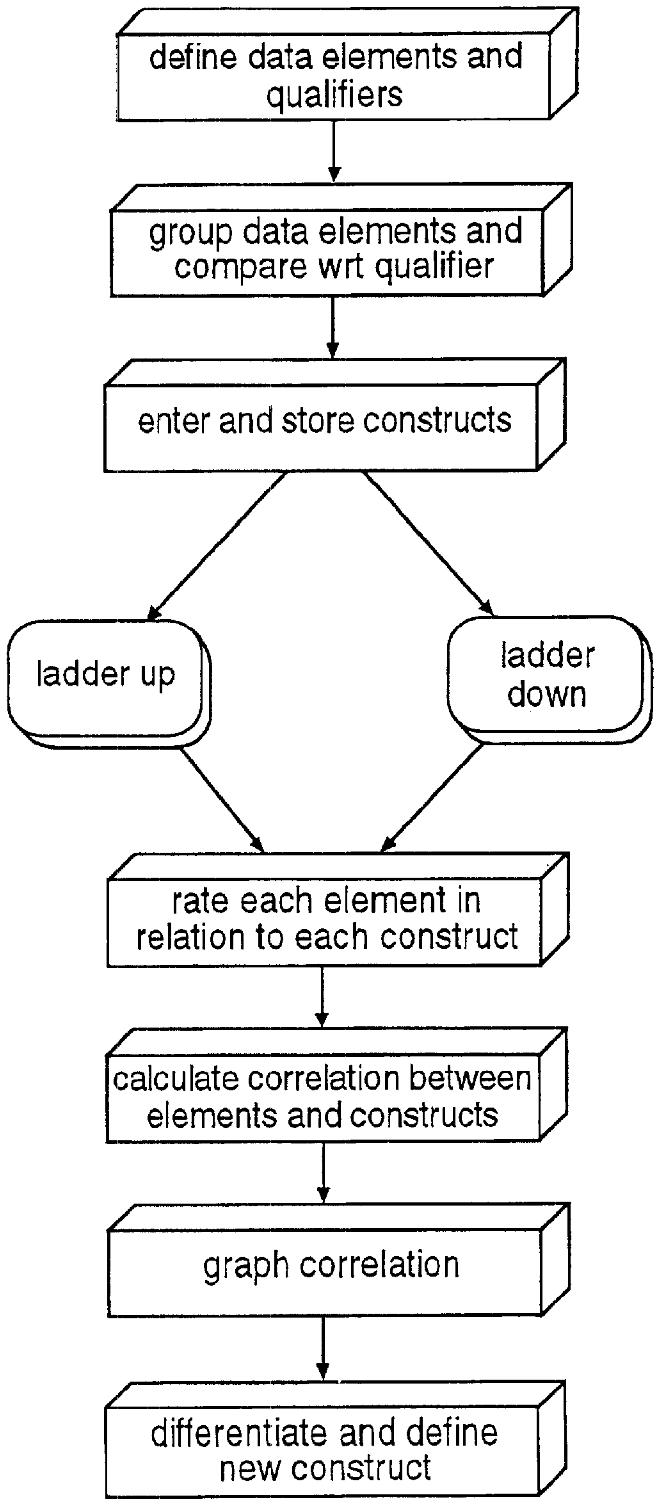
FIG. 1 shows a flow diagram illustrating the main processing steps.

The apparatus is preferably a data processing means, such as a personal computer, having a display and keyboard and/or mouse. FIG. 1 is a flow diagram showing the general structure of the program run by the data processing means. This is a simple diagram to assist understanding and it will be appreciated from the following that the process is interactive and that new data may be entered, existing data modified and processing may occur in any desired sequence.

A user may input selected data elements or select from stored data elements. Alternatively, the apparatus may prompt a user to assist in the creation of elements. Qualifiers can either be input by a user or selected from a set of stored qualifiers.

The elements are then sequentially grouped in groups of three elements comprising a pair of elements and a singleton. The pair of elements is presented to a user and the user is asked to specify how the elements are similar in terms of a selected qualifier. The user is then asked how the singleton differs from the pair of elements. This is done sequentially for a variety of element groupings and qualifiers. A number of characteristics or "constructs" are developed by this process—constructs may comprise a pair of contrasting characteristics defining two opposing poles.

To further refine the characteristics a user may be prompted to generalize or abstract a characteristic or identify a more specific characteristic. Upon selection, one of the refinement options may appear which questions a user to input a more generalized or specific characteristic.

A measurement range may then be input to define the range within which each element is to be ranked in accordance with a given characteristic. A user then enters a value within the range for each characteristic in relation to each element. A matrix of values is formed with the data elements and characteristics forming the axes of the matrix.

The apparatus then compares all rows and columns to find those rows which are most closely correlated. The most closely correlated rows and columns are combined to form new composite rows and columns. The composite rows and columns are then compared with the remaining rows and columns to determine the next most correlated rows and columns and so on until only two rows and columns remain.

The apparatus computes the degree of correlation between data elements and between characteristics. The results of this analysis may be shown dendritically. Different portions may be different colours to indicate the different degrees of correlation. The user may set a correlation threshold and the device will identify pairs of elements or characteristics above or below the correlation threshold.

Where highly correlated elements or characteristics are located, a user may choose to differentiate between the pair of elements or characteristics if a user believes that they should in fact be differentiated. The new characteristic entered by a user may then be ranked against all elements and a new matrix formed. Alternatively, the pair of elements or characteristics may be condensed into a single element or characteristic.

The apparatus allows a new element or characteristic to be entered at any stage, for ratings to be conducted against all elements and characteristics and for a new matrix to be calculated. This interactive process enables a highly refined model to be developed. Further, one model can be compared with another model to compare the correlation between models.

The following embodiment describes the operation of a computer program operating in a Windows™ environment running on a PC and implementing the method of the invention.

Figure 2:
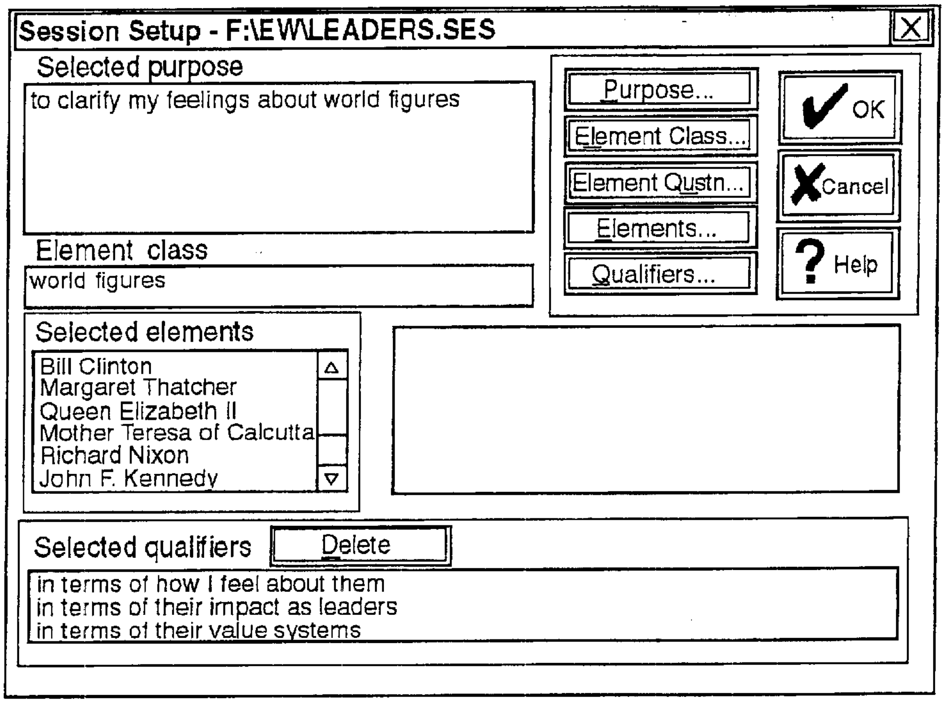
FIG. 2 shows a session set up screen.

Upon starting the program a development screen appears followed by a main menu. An existing session can be loaded by opening a file or a new session initiated. Once a session is started the next step is to enter session setup parameters. When the "session setup" button is selected a window as shown in FIG. 2 is shown. By clicking on the "purpose" button a purpose can be selected from a selection of purpose files. Alternatively, a defined purpose may be entered. The purpose reflects the reason a user has chosen to conduct a particular session.

A user may select an element class by selecting the "element class" button. Again, the user can select an element class from a stored selection or enter a user defined element class.

Figure 3:
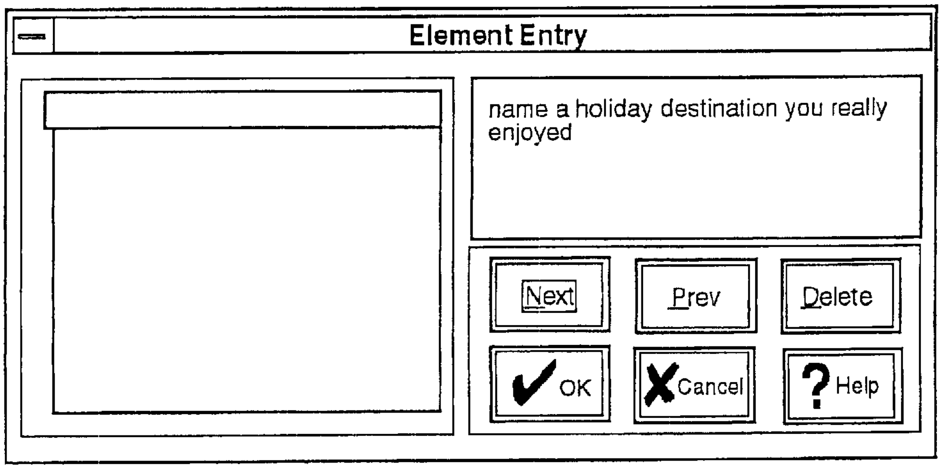
FIG. 3 shows an element entry screen.

A user may enter the elements for the session in a number of ways. The elements should be concrete, discrete and homogeneous and cover a good range of possible options. Elements must be of the same class. By clicking the "element question" button the screen shown in FIG. 3 appears which prompts a user with questions to help a user select elements for a session. The "next" and "prev" buttons cause the next or previous questions to be displayed "delete" deletes an entered element. "OK" may be selected to accept the elements and exit whereas "cancel" simply exits the screen. A user can enter desired elements as prompted.

Upon selecting the "elements" button the user can select a set of stored elements or enter desired elements. Likewise, upon selecting the "qualifiers" button a user can select pre-existing qualifiers or add user defined qualifiers. Qualifiers are used to channel the process in the desired way.

Once the parameters for the session are set the user clicks the "okay" button. Online help is provided in any dialogue by selecting the "help" button.

Figure 4:
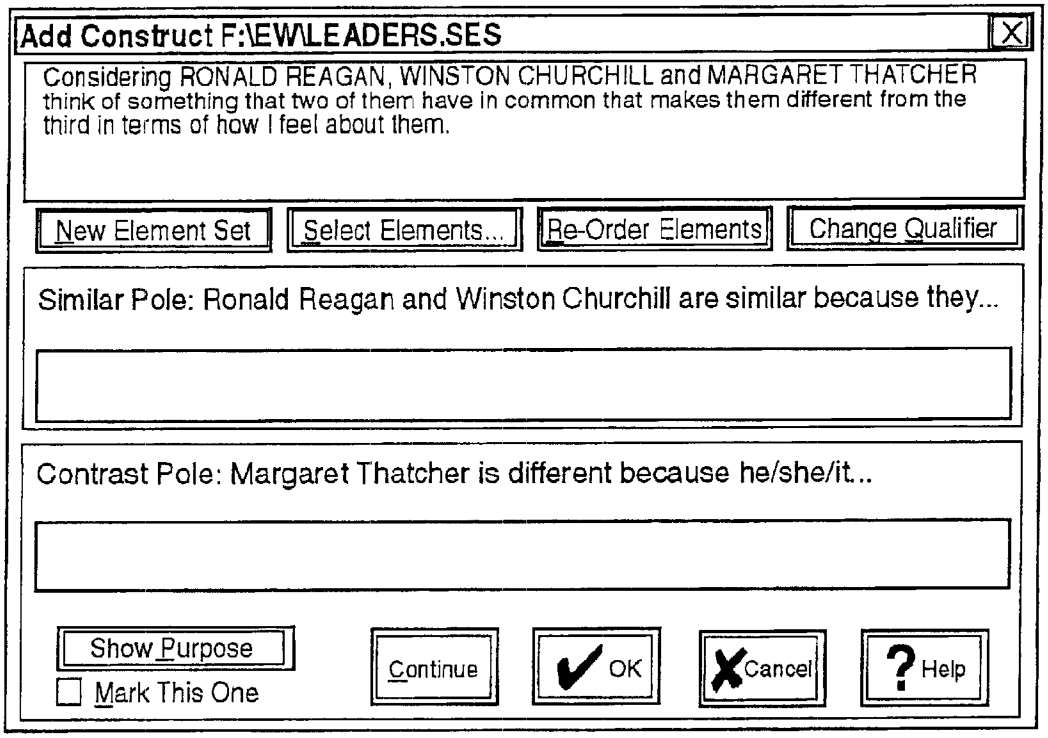
FIG. 4 shows a screen for adding a construct.

Once the parameters have been set up development of a model can commence. A user may then select an "add construct" option from the main screen to proceed. The dialogue window that appears is shown in FIG. 4. This window shows three elements: Ronald Reagan, Winston Churchill and Margaret Thatcher. The user is asked to state something that two elements have in common (Ronald Reagan and Winston Churchill) and something that makes the third (Margaret Thatcher) different from the other two in terms of the qualifier (how I feel about them). The user is prompted to enter in the first box how Ronald Reagan and Winston Churchill are similar. The user types in the similarity and moves to the second box to enter how Margaret Thatcher is different. This is the process of defining "constructs" comprising two contrasting poles. These constructs as stored as the construct creation process progresses.

Figure 5:
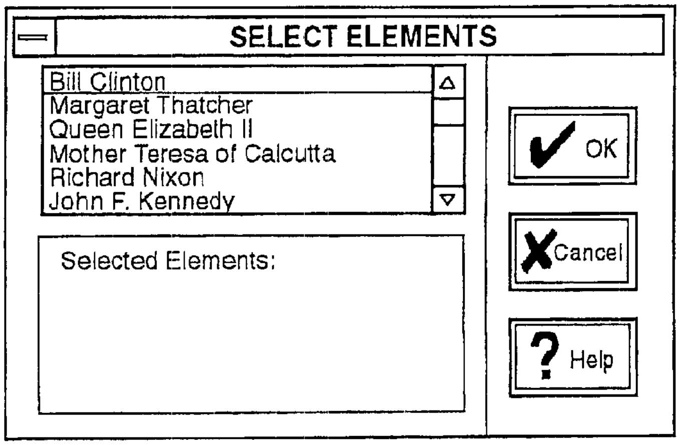
FIG. 5 shows a screen for selecting an element.

Once the first construct has been entered the user selects the "continue" button. The user is then prompted to add two more constructs in the same way for the same elements and qualifier. This continues until the user can think of no more constructs. The user may then select the "select elements" button to bring up the entire element set and a window as shown in FIG. 5. A user may then select the desired three elements by moving the cursor and clicking a mouse and, once three are selected, clicking on the "okay" button. In this way a user can define the three elements used to develop constructs.

Figure 6:
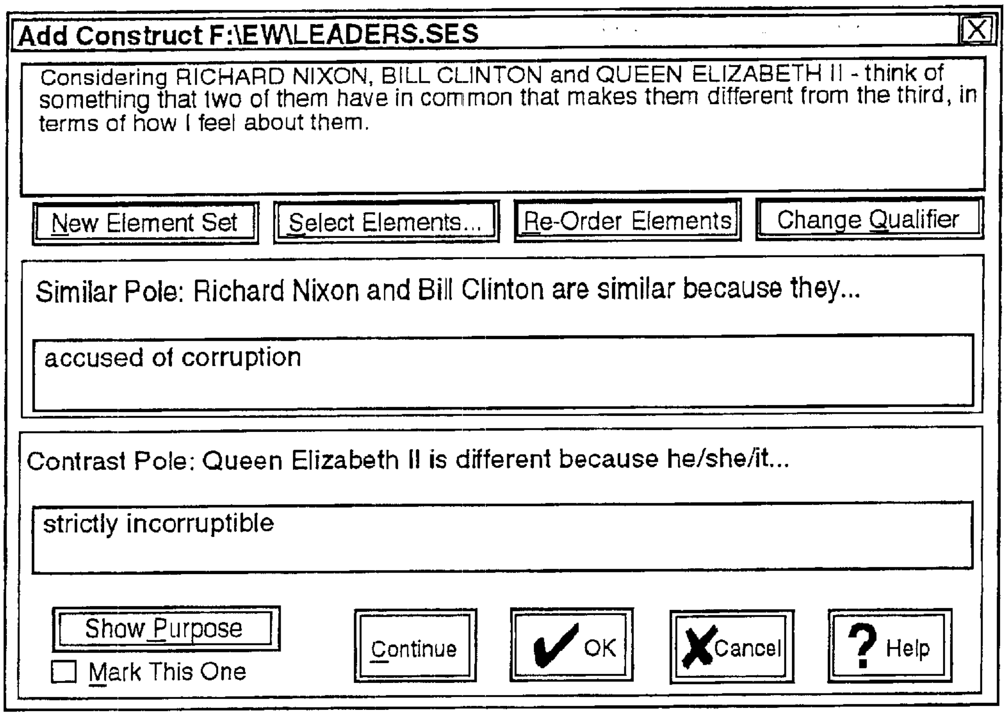
FIG. 6 shows a screen for adding a construct.

Alternatively, a user may select the "new element set" button (FIG. 4) in order for the computer to automatically select a new set of three elements. The user will then be presented with a new set of elements (Richard Nixon, Bill Clinton and Queen Elizabeth II) as shown in FIG. 6. Constructs can be entered in the same way for these elements in terms of the selected qualifier.

By selecting the "change qualifier" button (FIG. 4), the qualifier applied to the three elements can be varied. For example, "how I feel about them" may be changed to "their impact as leaders". Selecting the "re-order elements" button regroups the three elements into a different 2,1 grouping. This process may continue until a sufficient number of constructs have been formed. At this point a user can click the "okay" button to move onto the next stage.

Figure 7:
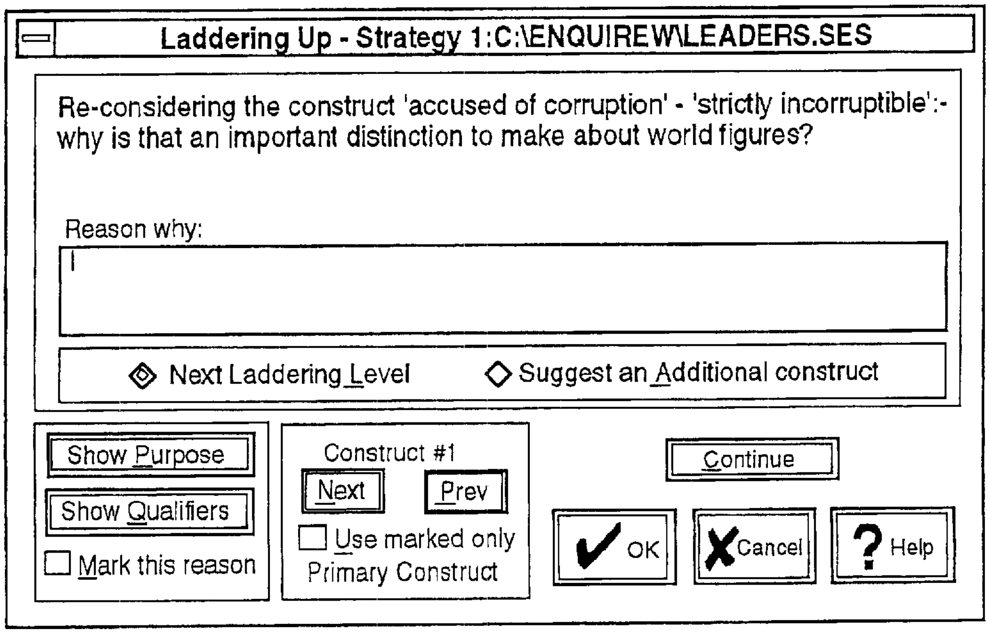
FIG. 7 shows a laddering up strategy screen according to a first strategy.
Figure 8:
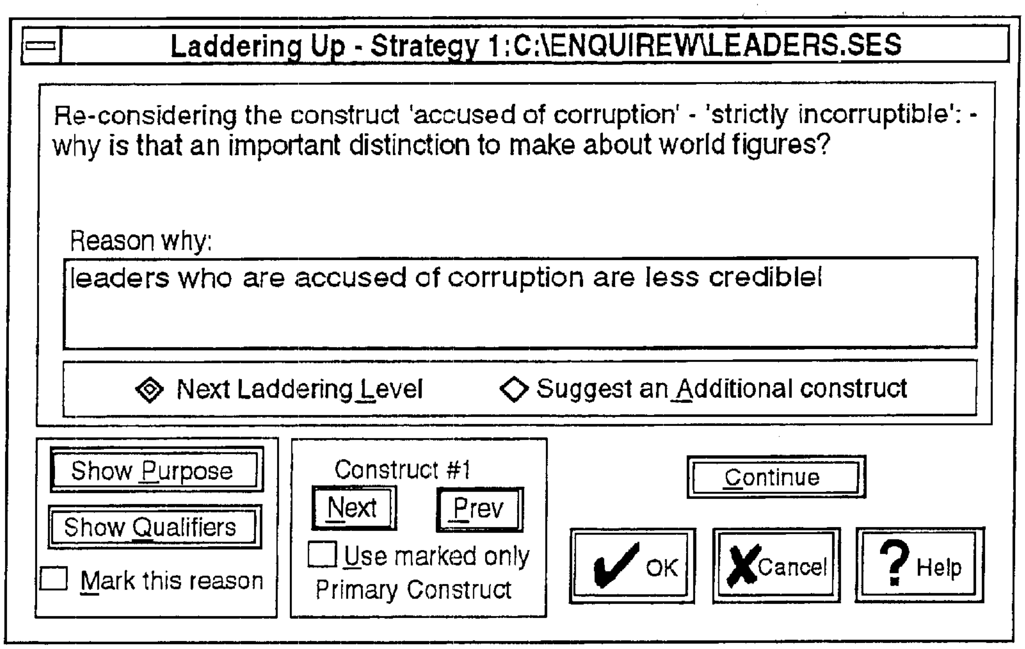
FIG. 8 shows the screen shown in FIG. 7 after data has been entered in the text box.

To further refine constructs "laddering up" or "laddering down" options may be used to create more generalized or specific constructs. If the "laddering up strategy 1" is selected a window as shown in FIG. 7 will appear. The user is asked to specify the important distinction between the constructs "accused of corruption" and "strictly incorruptible". The user may then enter their answer in the box "reasons why" (see FIG. 8). Constructs can be scrolled through by selecting the "next" or "prev" buttons. If the "next level" button is selected the user is asked to further define the reason given in the previous response. Usually this will be limited to three levels of refinement. Once the desired refinement has been achieved the "okay" button may be selected.

Figure 9:
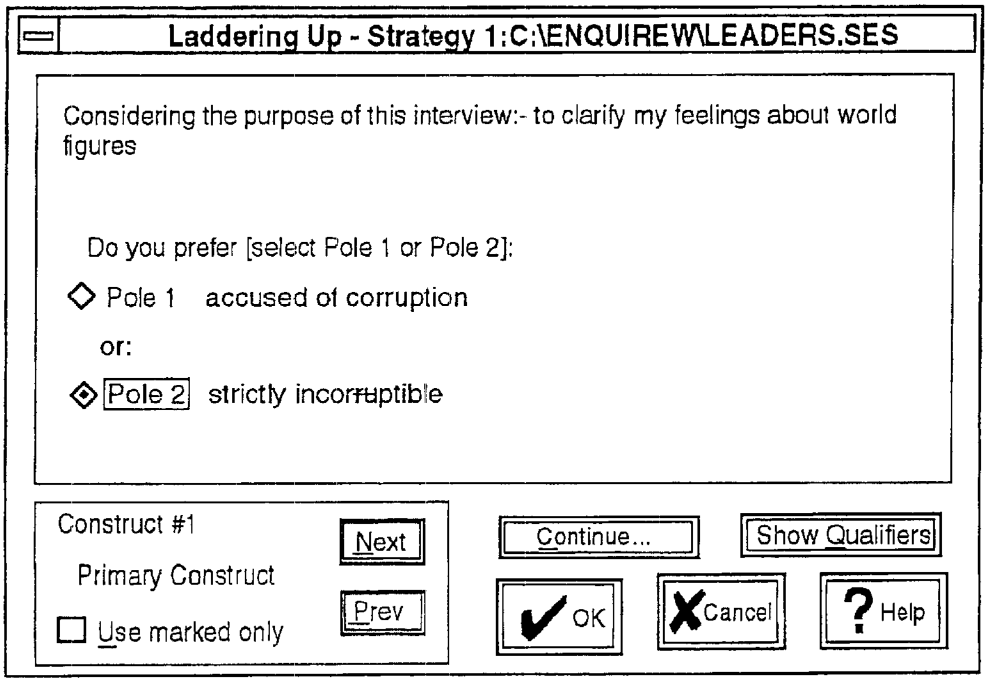
FIG. 9 shows a laddering up screen implementing a second strategy.

If the "laddering up: strategy 2" is selected a window as shown in FIG. 9 will appear. This presents the information in a slightly different manner. The user is asked to select which of the bipolar extremes of the construct he or she prefers. The preferred construct is selected by clicking on the button adjacent the construct to be selected (e.g. strictly incorruptible). The user is then asked to identify why one pole or the other is preferred. In this way, the user is also driven to determine what is the core reason for their preference.

Figure 10:
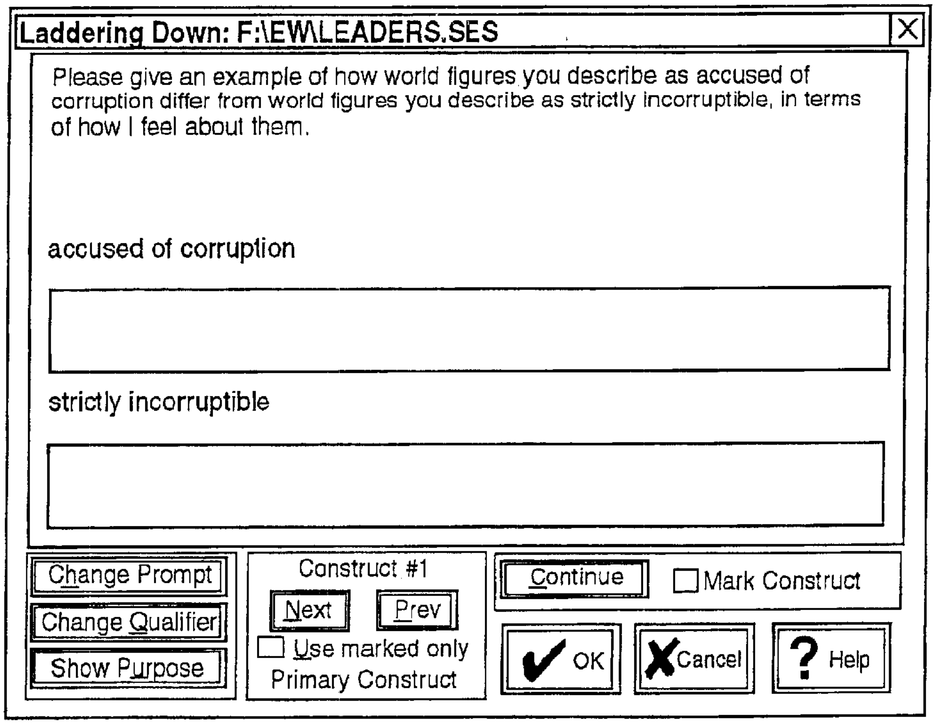
FIG. 10 shows a laddering down screen.

Alternatively, the user may wish to develop more specific constructs. For example, to evaluate a persons performance a user may want to focus upon what aspect of performance is to be compared. In this case a "laddering down" approach may be adopted. Upon selecting "laddering down" from the menu the "laddering down" dialogue button shown in FIG. 10 appears, This asks a user to give examples of either pole of a construct. By selecting the "change prompt" button a user can change the structure of the question at the top of the window. By selecting the "change qualifier" button the user can change the qualifier use in the question (i.e. how I feel about them). The user can move between constructs by selecting the "next" or "previous" buttons. Using the laddering down process, more specific constructs can be produced.

Figure 11:
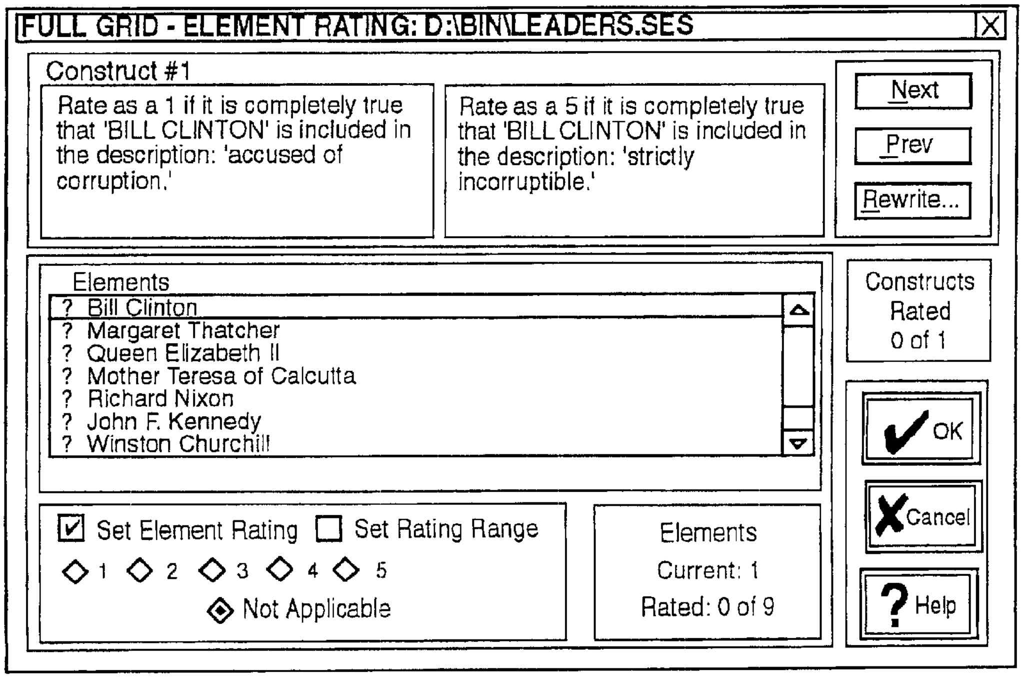
FIG. 11 shows a rating screen.

Once a user is happy with constructs the next step is to rate elements in relation to each construct. Upon selecting the rating option a window as shown in FIG. 11 appears. The user must first set the rating range to be used in the rating process. This may be achieved by and clicking on the button "set rating range" and selecting the number at the top end of the range. A user may then rate the first construct for each element by clicking on the diamond shaped box adjacent each number at the bottom left of the screen for each element. For example, the first element "Bill Clinton" is highlighted and clicking on the button adjacent the number 3 will rate Bill Clinton with the number 3. The bar will then move down to the next element to be rated.

Figure 12:
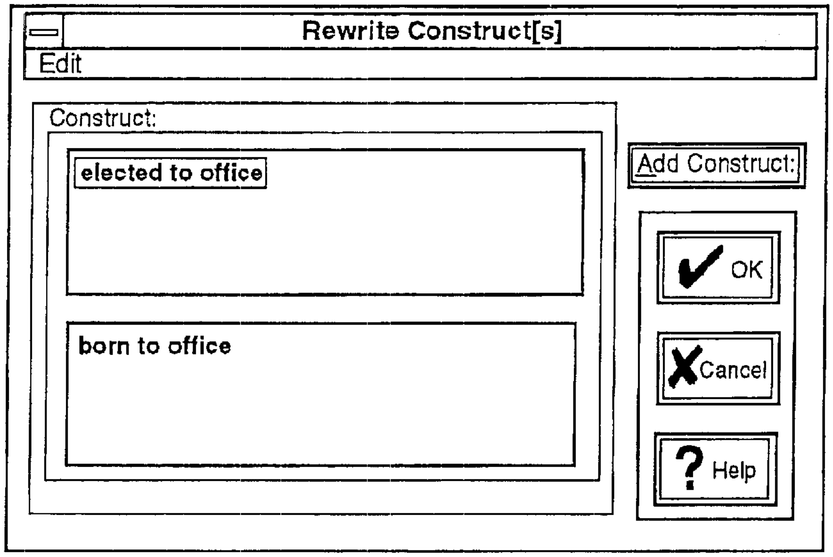
FIG. 12 shows a screen for facilitating the rewriting of constructs.

Once all of the elements are rated a user may select the "next" button to rate the elements in relation to the next construct in a similar manner. To go back to a previous construct the "prev" button may be selected. The "rewrite" button enables a user to rewrite a construct. Upon selecting the "rewrite" button a screen as shown in FIG. 12 appears and a user can change the constructs as desired. Once the desired constructs are entered the "OK" button may be selected. Once the elements are rated the "okay" button may be selected. The "cancel" button terminates the rating.

Figure 13:
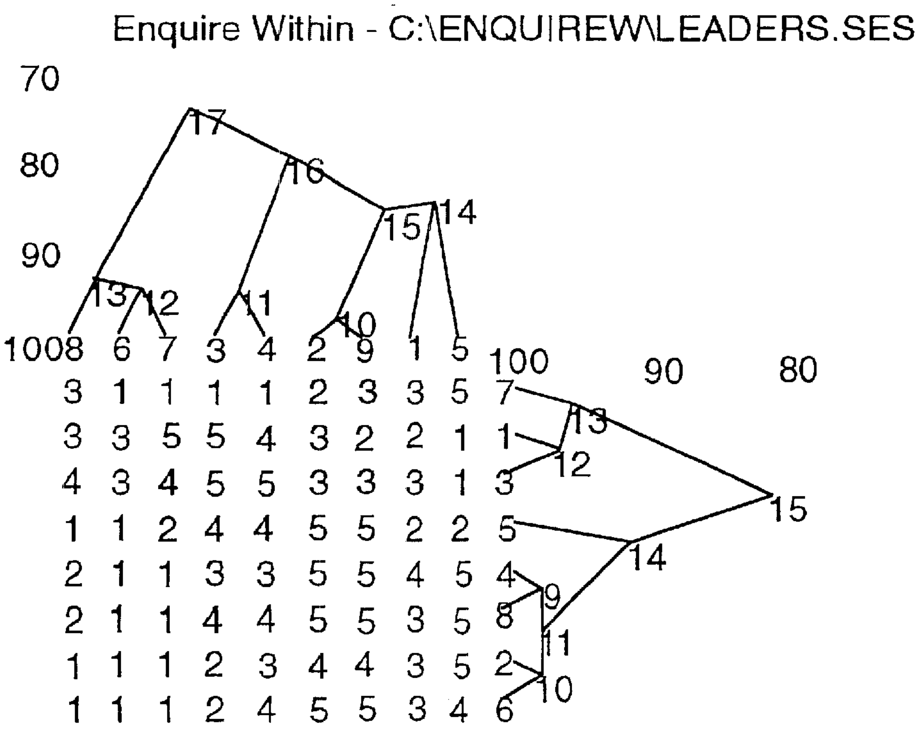
FIG. 13 shows a graphical representation of degrees of correlation between elements and constructs.

Once the elements have been rated the program develops a matrix of the ratings for each element in relation to each construct (see FIG. 13). The top row and right hand side column correspond to the elements and constructs respectively. All columns are compared to determine the most closely correlated columns. Correlation involves comparing each column to each other column. There are nine columns in the example shown. The two most closely correlated columns are then combined to form a new composite column or node 10. This node 10 is then compared to all remaining columns in the same manner. The next two most closely correlated columns are 2 and 5 and the new node 11 is created as a combination of both. This process continues until all columns have been condensed into the two nodes 16 and 17. The rows are processed in like fashion together with their inverses.

The axes 100, 90, 80, 70 indicate the degree of correlation between. rows and columns. These relationships are analysed dendritically. This enables a user to visually determine the degree of correlation between elements and constructs as shown in FIG. 13. Such a graphical representation may be shown on user request. The degree of correlation between rows may also be indicated using colour. A user may point to any particular element or construct and click on it to reveal the identity of the element or construct, or to select it for further differentiation.

To produce the dendritic diagram shown in FIG. 11 the nodes must be arranged to produce an arrangement in which connecting lines do not cross. To do this the nodes (13 and 16 for the columns of FIG. 13 ) forming the highest numbered node (e.g. 17) are firstly considered. The highest numbered node (16) of the nodes below node 17 is placed to the right of node 17 and the other node is placed to the left. Likewise node 12 is placed to the right and node 8 to the left of node 13. This procedure is carried out until all nodes are arranged in this manner. The rows and columns are then arranged in the matrix according to the determined order and the nodes placed according to their correlation levels (e.g. 80, 90, 100 etc) and joined by lines showing the linkages between nodes.

Figure 14:
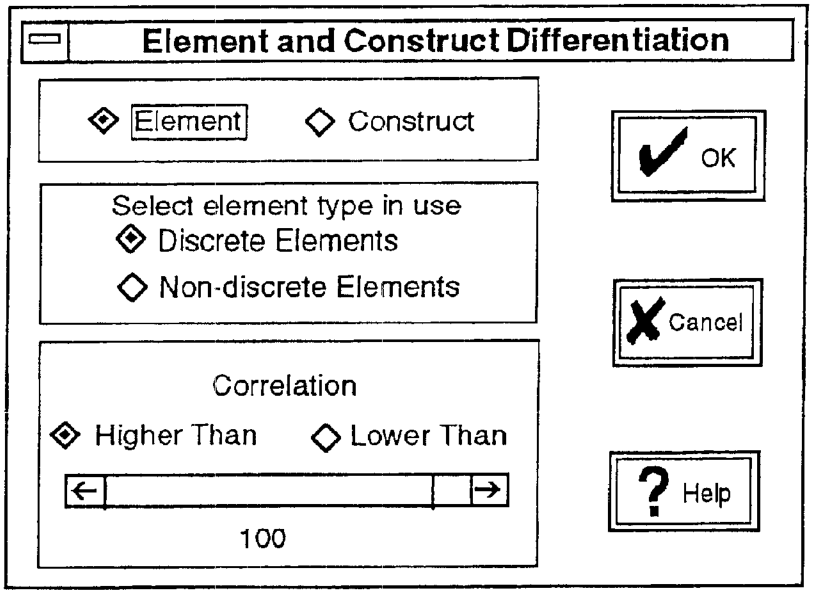
FIG. 14 shows an element and construct differentiation screen.

The next step is to differentiate elements and constructs. Upon selecting the differentiation option from the main menu a dialogue screen as shown in FIG. 14 will appear. Either an element or construct may be selected in the first box. Either discrete or non-discrete elements may be selected. In the lower box a user can select the correlation level to be applied to identify pairs of constructs or elements above a predetermined threshold. Once the correlation level is selected by moving the bar, the "okay" button may be selected to proceed.

Figure 15:
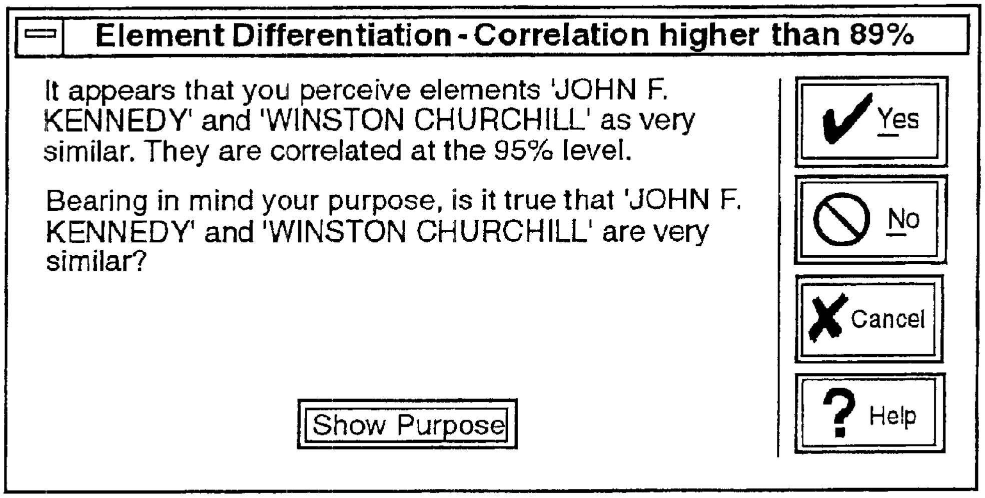
FIG. 15 shows an element differentiation screen for displaying elements having a degree of correlation higher than a set threshold.
Figure 16:
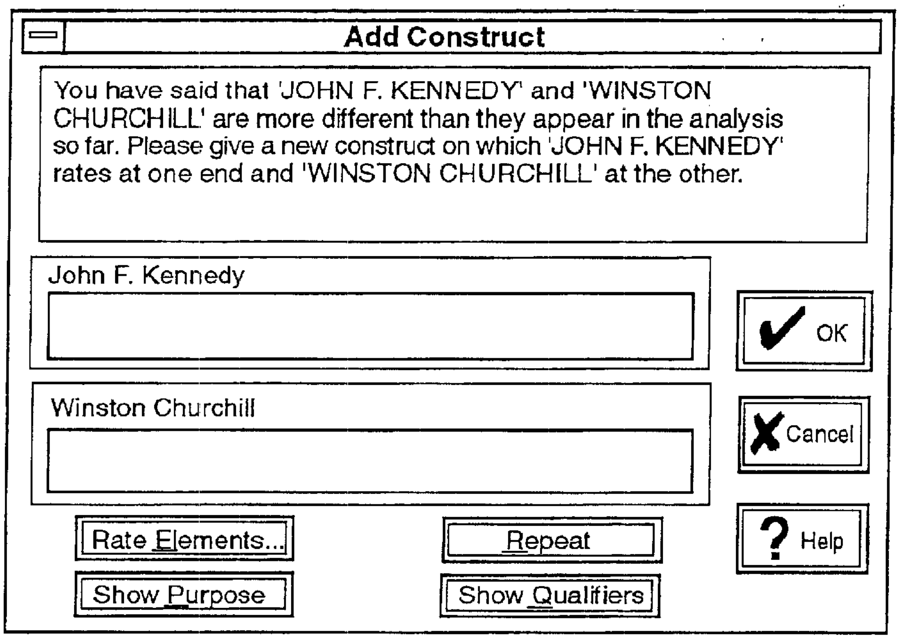
FIG. 16 shows a screen for adding a construct.

Next a window as shown in FIG. 15 will appear. The window will identify to a user those elements or constructs that are closely correlated and ask whether it is true that the elements or constructs are very similar. If a user selects the "yes" button the next set of closely correlated elements is shown. If the user selects the "no" button, a window as shown in FIG. 16 will appear asking the user to enter constructs identifying the differences between the two elements or constructs. The user then enters the two poles of the construct within the windows adjacent the elements or constructs shown (i.e.

John F. Kennedy and Winston Churchill). Having redefined the construct the user may then re-rate the elements in relation to the new construct by selecting the "rate elements" button. Once the elements have been rated against the new construct (as previously described) and the "okay" button is selected the user is returned back to the window as shown in FIG. 16. By selecting the "okay" button the user is returned to the main menu.

A user can sequentially go through the differentiation process selecting different levels of correlation to incrementally change the model.

Figure 17:
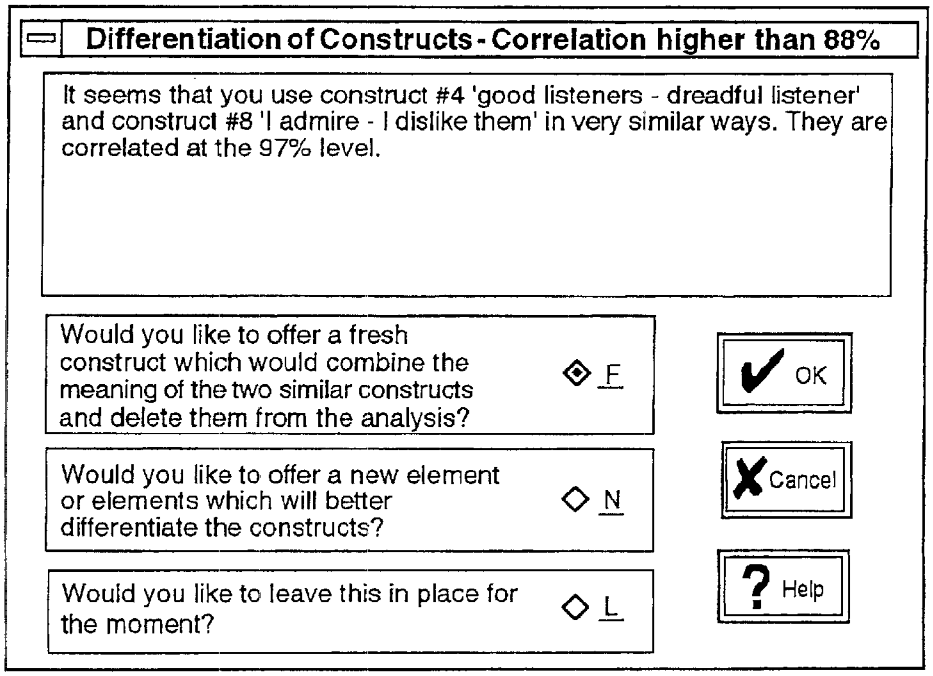
FIG. 17 shows a screen for identifying constructs having a correlation greater than a set threshold.

When differentiation of a construct is selected from the window in FIG. 14 a window as shown in FIG. 17 appears. The user is given the option of supplying a construct which combines the meaning of the two similar constructs, entering a new element which will better differentiate the constructs or leaving the model as it is. Upon clicking on the button to offer a fresh construct and selecting "okay" a user can enter a construct to replace the previous construct. Upon selecting the "Rate Elements" button the elements can be re-rated.

Figure 18:
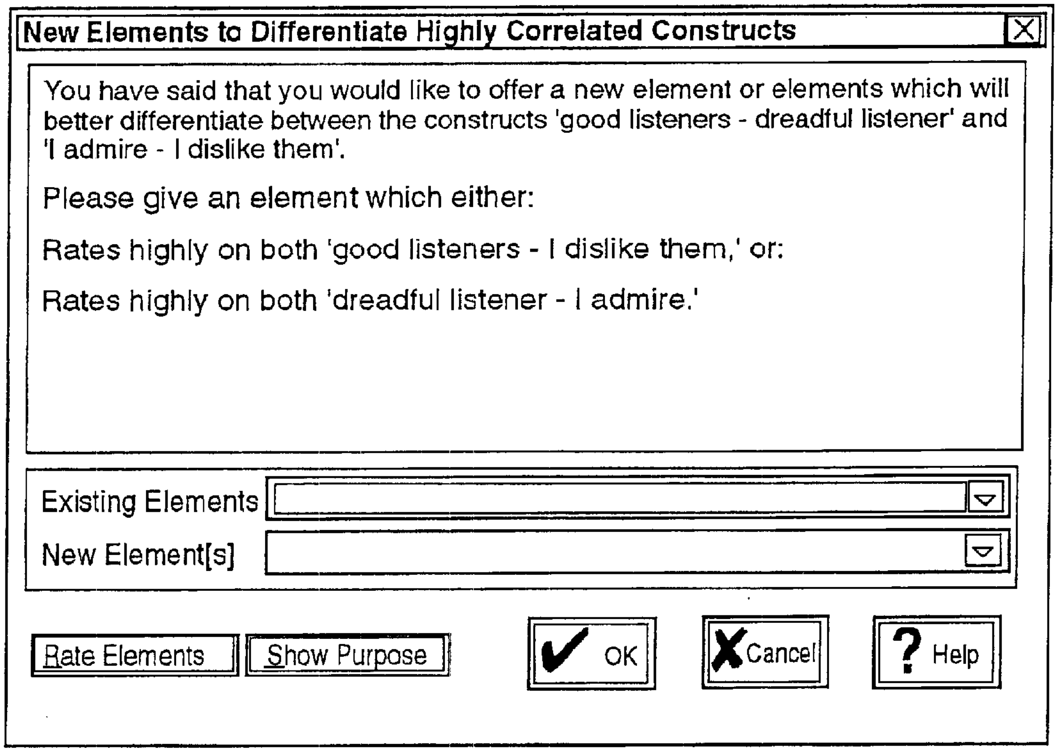
FIG. 18 shows a screen for entering new elements to better differentiate highly correlated constructs.

Upon selecting the option to enter a new element and selecting "okay" the window shown in FIG. 18 appears. A user may scroll through existing elements and enter a new element from a range of options or type in a new element. Upon selecting the "rate elements" option the user can re-rate the new elements in relation to the constructs as before. Once completed the user clicks on the "okay" button.

The program archives elements and constructs as they are created. A session (i.e. elements and constructs that have been rated and analysed) may be saved at any stage so that a user may return to a desired point of development.

There is also a facility to mark elements or constructs so that only selected elements or constructs are displayed. Elements or constructs may also be prioritised (e.g. high, medium, or low) so that different priorities or groups of priorities may be selectively displayed.

Figure 19:
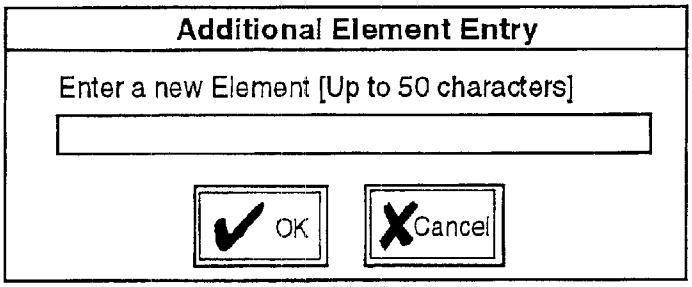
FIG. 19 shows an additional element entry screen.

It will be appreciated that further elements or constructs can be added or deleted at any stage (i.e. by selecting an "add element" option from the main menu the screen shown in FIG. 19 appears to allow entry of new elements), the elements re-rated against each construct and a new model generated and graphically displayed by the program. The interactive nature of the program and the prompting of the computer enables a highly refined model to be produced by a user in private without requiring the intervention of a counsellor. The method and apparatus removes interviewer bias and enables a content specific exploration within a user's own framework. There is also the facility to readily change the model and compare it with others. When compared matrices have the same elements and constructs a direct measure of correlation between matrices can be calculated. When only elements are common the comparison between matrices may be useful to identify areas for discussion etc.

It is to be appreciated that the invention may be implemented in a number of ways and that the following description is given purely by way of example. For example it is to be appreciated that a visual display is not required and that the apparatus could output audio information and include speech recognition software to respond to voice comments.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope of the present invention as set out in the appended claims.

What we claim is:

1. An apparatus for analysing data comprising:

means for inputting or selecting a plurality of data elements according to user command;

means for grouping data elements into a singleton and a pair of elements;

means for communicating the elements of the groups to a user;

means for inputting or selecting a common characteristic between the pair of elements and a difference characteristic between the pair of elements and the singleton, means responsive to user command for ranking data elements in relation to selected characteristics; and means for comparing rankings between elements and/or characteristics and for determining the elements and/or characteristics having selected degrees of correlation including means for selecting a user defined correlation threshold and displaying those elements or characteristics above or below the correlation threshold.

2. An apparatus as claimed in claim 1 wherein the data elements may be inputted by a user or selected from a pre-existing selection of data elements stored in the apparatus.

3. An apparatus as claimed in claim 1 wherein the user may select an automated element creation option in which the apparatus produces questions to assist a user in creating a set of elements.

4. An apparatus as claimed in claim 1 wherein a user is prompted to input the common and difference characteristics in relation to a defined qualifier.

5. An apparatus as claimed in claim 4 wherein a plurality of qualifiers may be input by a user or selected from a selection of stored qualifiers.

6. An apparatus as claimed in claim 1 wherein the apparatus prompts a user to provide common and difference characteristics for a plurality of element groupings.

7. An apparatus as claimed claim 1 wherein a user can select the elements to be compared.

8. An apparatus as claimed in claim 1 wherein a user may reorder selected data elements into different groupings.

9. An apparatus as claimed in claim 1 wherein the characteristics input by a user are stored by the apparatus.

10. An apparatus as claimed in claim 1 wherein, upon user selection, a window prompts the user to generalize a selected characteristic and store a new characteristic.

11. An apparatus as claimed in claim 1 wherein, upon user actuation, a window appears to prompt a user to more specifically define a characteristic and store a new characteristic.

12. An apparatus as claimed in claim 1 wherein the means for ranking data elements includes means responsive to user input for defining a measurement range.

13. An apparatus as claimed in claim 12 wherein a user may enter a value within the measurement range for each characteristic in relation to each data element.

14. An apparatus as claimed in claim 13 wherein the apparatus forms a matrix having the data elements along one axis, the characteristics along the other and the values entered forming the matrix.

15. An apparatus as claimed in claim 14 wherein the apparatus compares the values for each column of elements and/or each row of characteristics to find the closest correlation, forms a new column and/or row combining the most closely correlated rows and/or columns respectively and continues to compare rows and/or columns in this manner until only two rows and/or columns are left.

16. An apparatus as claimed in claim 15 wherein the apparatus stores figures representative of the correlation between rows and columns of the matrixes.

17. An apparatus as claimed in claim 15 wherein the correlation between columns and rows is shown graphically on a display device.

18. An apparatus as claimed in claim 17 wherein the rows and/or columns are arranged by iteratively comparing the two rows and/or columns forming a selected row and/or column and placing the most recently formed row and/or column to the right of the selected row and/or column and the other row and/or column to the left.

19. An apparatus as claimed in claim 17 wherein the correlation between columns and rows is shown dendritically.

20. An apparatus as claimed in claim 17 wherein color is used to indicate columns or rows having levels of correlation within predefined ranges.

21. An apparatus as claimed in claim 1 including differentiation means which displays elements or characteristics having a required degree of correlation to prompt a user to review the elements or characteristics.

22. An apparatus as claimed in claim 21 wherein a user has the option of combining any pair of closely correlated elements or characteristics.

23. An apparatus as claimed in claim 21 wherein a user may enter a new characteristic to define a difference between two correlated elements or characteristics.

24. An apparatus as claimed in claim 23 wherein all elements may be re-rated in respect of the new characteristic to construct a new matrix.

25. An apparatus as claimed in claim 1 wherein a new characteristic may be added at any stage, ranked in relation to each element and processed to form a new matrix.

26. An apparatus as claimed in claim 1 wherein the apparatus includes checking means which checks to ensure that a predetermined number of data elements and characteristics have been entered and rated so as to provide useful results.

27. An apparatus as claimed in claim 26 wherein a window appears if insufficient information is provided informing a user that more information must be inputted.

28. An apparatus as claimed in claim 1 wherein the apparatus includes means for comparing the results of an analysis with the results of a previous analysis.

29. An apparatus as claimed in claim 1 wherein data is archived as a user modifies data.

30. An apparatus as claimed in claim 1 wherein the apparatus is a data processing means having a visual display for communicating information to a user.

31. An apparatus as claimed in claim 1 including a keyboard and or mouse for data entry or selection.

32. A computer controlled method of analysing data comprising:

inputting a plurality of data elements into a data processor or selecting a plurality of elements. stored in memory of the data processor;

actuating the data processor to group the data elements into a singleton and a pair of elements;

inputting or selecting a common characteristic between the pair of elements and a difference characteristic between the pair of elements and the singleton;

inputting ranking information to the data processor to rank the data elements in relation to the characteristics;

processing rankings between elements and/or characteristics in the data processor to determine elements and/or characteristics having selected levels of correlation;

inputting a correlation threshold; and displaying those elements or characteristics having a degree of correlation above or below the correlation threshold.

33. A method as claimed in claim 32 wherein the data processor automatically groups the data elements upon user actuation.

34. A method as claimed in claim 32 wherein the data processor groups the data elements according to user selection.

35. A method as claimed in claim 34 wherein the data processor processes rankings only if a required number of data elements and characteristics have been entered and rated.

36. A method as claimed in claim 34 wherein the data processor compares the result of an analysis with results of a previous analysis.

37. A method as claimed in claim 32 wherein the data processor displays a qualifier in association with the grouped elements and a user is required to input characteristics in relation to the qualifier.

38. A method as claimed in claim 37 wherein a user inputs a qualifier to the data processor.

39. A method as claimed in claim 37 wherein the qualifier is selected by a user from a plurality of qualifiers stored in said data processor.

40. A method as claimed in claim 32 wherein a plurality of characteristics are input for a plurality of different element groupings.

41. A method as claimed in claim 32 wherein the data processor prompts a user to input a generalization of a characteristic upon user actuation.

42. A method as claimed in claim 32 wherein the data processor prompts a user to more specifically define a characteristic upon user actuation.

43. A method as claimed in claim 32 wherein elements are ranked in relation to a characteristic by a user entering or selecting a value within a measurement range to the data processor.

44. A method as claimed in claim 43 wherein the data processor processes the values into a matrix in which the data elements define one axis and the characteristics define the other axis.

45. A method as claimed in claim 44 wherein the data processor compares the values for each column of elements and/or row of characteristics to find the closest correlation, forms a new column and/or row combining the most closely correlated rows and/or columns respectively and continues to compare rows and/or columns in this manner until only two rows and/or columns are left.

46. A method as claimed in claim 45 wherein the data processor displays the correlation between columns and rows of the matrix, representing the correlation between elements and characteristics.

47. A method as claimed in claim 46 wherein the data processor shows the correlation between rows and columns dendritically.

48. A method as claimed in claim 45 wherein the rows and/or columns are arranged by iteratively comparing the two rows and/or columns forming a selected row and/or column and placing the most recently formed row and/or column to the right of the selected row and/or column and the other row and/or to the left.

49. A method as claimed in claim 32 wherein the data processor prompts a user to review elements or characteristics having a defined degree of correlation.

50. A method as claimed in claim 49 wherein the data processor displays sets of two closely correlated elements or characteristics and combines them on user selection.

51. A method as claimed in claim 32 wherein the data processor processes rankings only if a required number of data elements and characteristics have been entered and rated.

52. A method as claimed in claim 32 wherein the data processor compares the result of an analysis with results of a previous analysis.

53. An apparatus for analysing data comprising:

means for inputting or selecting a plurality of data elements according to user command;

means for grouping data elements into groups;

means for communicating the elements of the groups to a user and prompting the user to input common and different characteristics in relation to a defined qualifier;

means for inputting or selecting characteristics within and/or between data element groups according to user command;

means responsive to user command for ranking data elements in relation to selected characteristics; and means for comparing rankings between elements and/or characteristics and for determining the elements and/or characteristics having selected degrees of correlation.

54. An apparatus for analysing data comprising:

means for inputting or selecting a plurality of data elements according to user command;

means for grouping data elements into groups;

means for communicating the elements of the groups to a user;

means for inputting or selecting characteristics within and/or between data element groups according to user command;

means responsive to user command for ranking data elements in relation to selected characteristics;

means for comparing rankings between elements and/or characteristics and for determining the elements and/or characteristics having selected degrees of correlation; and means which, upon user selection, prompts a user to generalize or to more specifically to define a characteristic and store a new characteristic input by the user.

* * * * *